United States Patent

[11] 3,573,550

| | | |
|---|---|---|
| [72] | Inventor | Louis P. Baker, Jr.<br>Buena Park, Calif. |
| [21] | Appl. No. | 805,257 |
| [22] | Filed | Mar. 7, 1969 |
| [45] | Patented | Apr. 6, 1971 |
| [73] | Assignee | M & T Chemicals, Inc.<br>New York, N.Y. |

[54] AUTOMATICALLY RESETTING TRANSIENT PROTECTION DEVICE
17 Claims, 12 Drawing Figs.

[52] U.S. Cl............................................... 317/16,
 307/252, 317/22, 317/31, 317/33, 317/40
[51] Int. Cl............................................... H02h 3/00,
 H02h 7/00, H02h 5/00
[50] Field of Search............................................... 317/31, 50,
 61.5, 13, 33, 16; 307/235; 328/150

[56] References Cited
UNITED STATES PATENTS
| | | | |
|---|---|---|---|
| 3,299,341 | 1/1967 | Corey............................ | 321/47 |
| 3,348,131 | 10/1967 | Banks............................ | 323/22 |
| 3,375,405 | 3/1968 | Fallon .......................... | 317/16 |
| 3,475,653 | 10/1969 | Odenberg..................... | 317/16 |

*Primary Examiner*—Milton O. Hirshfield
*Assistant Examiner*—Ulysses Weldon
*Attorneys*—Robert P. Auber, Leonard R. Kohan and James J. McKeever ABSTRACT: Apparatus for protecting electrical circuitry from voltage transients in a power supply or the like connected to the circuitry. A plurality of diodes and a silicon controlled rectifier are connected in series across the output of the power supply. The silicon controlled rectifier is triggered by a predetermined transient voltage level, and the output voltage of the power supply is clamped at the sum of the forward voltage drops of the diodes and controlled rectifier, the sum being set above the normal output voltage level of the power supply. The silicon controlled rectifier then commutates as soon as the transient ceases and the voltage level drops to normal. Various configurations are provided for DC or AC systems, as well as for remote sensing, and additional compensating circuits are employed for various applications.

Patented April 6, 1971

INVENTOR.
LOUIS P. BAKER JR.
BY Fulwider, Patton, Rieber,
Lee, and Utecht

ATTORNEYS

INVENTOR.
LOUIS P. BAKER JR.

BY Fulwider, Patton, Rieber, Lee, and Utecht
ATTORNEYS

AUTOMATICALLY RESETTING TRANSIENT PROTECTION DEVICE

BACKGROUND OF THE INVENTION

The present invention relates generally to voltage transient protection devices and, more particularly, to improvements in such devices employing a silicon controlled rectifier together with means for providing automatic commutation of the controlled rectifier when the transient ceases.

A good deal of modern electrical circuits, and especially circuits employing semiconductor devices, have operating voltages relatively close to their maximum rated voltages and such circuitry is relatively vulnerable to the deleterious effects of voltage transients. For this reason, it is rapidly becoming a common practice to incorporate a transient voltage protection system either in the power supply for the electrical circuitry or in the circuitry itself.

The characteristics of most semiconductor devices is such that they can be damaged even when subjected to very short duration transient overvoltages. Therefore, overvoltage protection devices such as fuses and circuit breakers which operate on a thermal principal ordinarily respond much too slowly and usually cannot be relied upon to adequately protect semiconductor devices. The requirement that the transient protection system must be capable of rapidly responding to very brief transient voltages has led to the use of silicon controlled rectifiers which have turn-on times of the order of magnitude of a few microseconds.

The silicon controlled rectifier is normally used in connection with appropriate circuitry for triggering the rectifier in response to a voltage transient, to divert the transient from the device being protected. However, one characteristic of the silicon controlled rectifier is that it remains in the "on" or conducting state until the current through the rectifier is reduced below a minimum level known as the "holding current." It has, therefore, been necessary in the past to provide auxiliary circuitry to substantially momentarily disconnect the voltage supply from the silicon controlled rectifier to return the rectifier to the "off" or nonconducting state, the transition being known in the art as "commutation" of the rectifier.

Commutation of a silicon controlled rectifier has usually been accomplished by a thermal device, such as a fuse or circuit breaker, which was heated by the increased current flow through the rectifier. However, in many applications the protected electrical circuitry must be substantially continually supplied with power regardless of the presence of voltage transients. In this regard, fuses, manually resettable circuit breakers, or time-delayed resetting circuit breakers leave such electrical circuitry without power for too long a time.

Additionally, ordinary transient protection systems for use with electrical circuitry are normally incorporated in either the power supply or the protected circuit. In either case, the interchangeability of power supplies and electrical circuitry is substantially impaired because of the possible mismatch of transient characteristics of the different power supplies and electrical circuits.

Hence, there has long been a need in the electrical arts for an improved transient protection device utilizing a controlled rectifier for rapid response to fast rise time transients and also capable of commutating the rectifier automatically a short time after the transient has passed. There has also been the need for a relatively simple, convenient, and easily installed transient protection device to facilitate the interchangeability of different power supplies and electrical circuitry being protected.

SUMMARY OF THE INVENTION

The present invention provides an improved automatically resetting transient protection device. In a presently preferred embodiment, the protection device can be completely separate from the power supply and protected electrical circuits with which it is used. The transient protection device of the present invention is adapted to be connected directly across the connection between a power supply or the like and the protected electrical circuit. The transient protection device utilizes semiconductor devices of the reverse-biased triode thyristor type, such as a silicon controlled rectifier or the like, which reacts very quickly to the occurrence of a voltage transient.

Additionally, the present invention includes a biasing means to generate an electrical potential in series with the silicon controlled rectifier to provide for automatic commutation of the rectifier when the transient ceases. To this end, a presently preferred embodiment of the invention utilizes the forward voltage drop characteristic of a plurality of diodes connected as a diode string in series with the controlled rectifier in order to clamp the output voltage of the power supply at a safe voltage level during an overvoltage transient and to provide commutation of the controlled rectifier almost immediately following the termination of the voltage transient.

The transient protection device of the present invention may be constructed as a self-contained unit separate from the power supply and the protected electrical circuitry, and no separate power supply is required to operate the device. Once installed, the normal standby power drain of the protection device is very small.

In addition, the transient protection device of the present invention may be constructed with a number of modifications to improve its operation under certain specific conditions dictated by the internal characteristics of either the power supply or the protected electrical circuitry.

DESCRIPTION OF THE PREFERRED EMBODIMENTS

Figure 1:
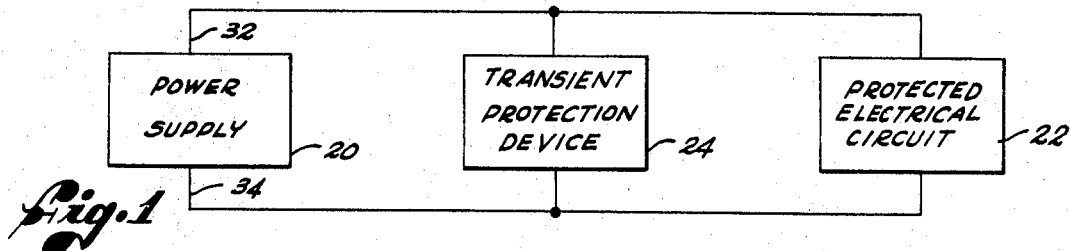
FIG. 1 is a block diagram showing the incorporation of the transient protection device of the present invention in a conventional power supply and protected circuitry arrangement.

Referring now to the drawings, and particularly to FIG. 1 thereof, a power supply 20 is connected via a pair of output lines 32, 34 to an electrical circuit 22. A transient protection device 24, constructed according to the present invention, is connected directly across the connection between the power supply 20 and the protected circuit 22.

The transient protection device 24 is a self-contained unit having internal characteristics which are selectively determined by the particular internal characteristics and requirements of the power supply 20 and protected electrical circuit 22. Thus, different power supplies 20, having different characteristics, may be used with different electrical circuits 22, and a particular transient protection device 24 can be selected to provide the necessary protection for the electrical circuit.

Figure 2:
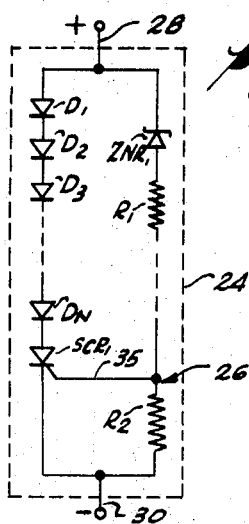
FIG. 2 is an electrical schematic diagram of the basic electric circuit of the transient protection device of the present invention.

A basic circuit 26 for the transient protection device 24 constructed according to the present invention is shown in FIG. 2. A plurality of diodes $D_1$, $D_2$, $D_3$, .....$D_N$ are connected in series with a silicon controlled rectifier $SCR_1$ between positive and negative terminals 28, 30 respectively, of the circuit 26. The diodes $D_1-D_N$ and silicon controlled rectifier $SCR_1$ are connected for forward conduction from the positive terminal 28 through to the negative terminal 30. In operation, the positive and negative terminals 28, 30 of the circuit 26 are connected to the respective positive and negative output lines 32, 34 respectively, of the power supply 20 shown in FIG. 1.

In the absence of voltage transients, the controlled rectifier $SCR_1$ is normally in its nonconducting or "off" state. To trigger the controlled rectifier $SCR_1$ when a voltage transient appears across the positive and negative terminals 28, 30 a Zener diode $ZNR_1$ is connected in series with resistors $R_1$ and $R_2$ between the terminals. The Zener diode $ZNR_1$ is normally back-biased by connecting its cathode to the positive terminal 28. The gate lead 35 of the controlled rectifier $SCR_1$ is connected to the junction of the resistors $R_1$ and $R_2$. The breakover voltage of the Zener diode $ZNR_1$ and the resistance values of resistors $R_1$ and $R_2$ are selected so that the Zener diode breaks down, or conducts, when the voltage between the positive and the negative terminals 28, 30 exceeds a particular preselected threshold voltage. When the Zener diode $ZNR_1$ conducts, the voltage developed across resistor $R_2$ is applied to the gate 35 of the controlled rectifier $SCR_1$, triggering the rectifier into the conducting state.

While the use of the series resistors $R_1$ and $R_2$ results in a stable trigger circuit, it should be appreciated that, for certain silicon controlled rectifiers, it may only be necessary to employ a single resistor between the Zener diode $ZNR_1$ and the gate lead 35 of the rectifier.

The threshold voltage between the positive and the negative terminals 28, 30 of the circuit 26 is normally selected to be some value above the normal output voltage of the power supply 20, but below the maximum voltage which can be supplied to the protected electrical circuit 22 without damage.

When the output voltage of the power supply 20 at least equals or exceeds the selected threshold voltage, the controlled rectifier $SCR_1$ is triggered into conduction as noted above. Current from the positive terminal 28 flows through the series string of diodes $D_1$ through $D_N$ and the controlled rectifier $SCR_1$ and the voltage which appears between the positive and negative terminals 28, 30 is clamped at the sum of the forward voltage drops of the diodes and the rectifier.

The transient voltage above the clamp voltage must necessarily appear as a voltage drop across the internal resistance of the power supply 20. Thus, the magnitude of the current which may flow through the diodes $D_1-D_N$ and the controlled rectifier $SCR_1$ is controlled, for the most part, by the internal resistance of the power supply 20. The power handling capabilities of the diodes $D_1-D_N$ and controlled rectifier $SCR_1$ should be chosen accordingly. In any event, it should be noted that the voltage appearing between the positive and negative terminals 28, 30 of the circuit 26 when the controlled rectifier $SCR_1$ is triggered cannot rise substantially above the clamp voltage determined by the forward voltage drops of the diodes $D_1-D_{N1}$.

A characteristic of the silicon controlled rectifier, such as rectifier $SCR_1$, is that once it is triggered, it will remain conducting even after the triggering voltage has been removed. The silicon controlled rectifier will return to its nonconducting state only if the current through the anode-cathode junction is reduced below a particular holding current level. In the particular embodiment of the circuit 26 shown in FIG. 2, the current through the controlled rectifier $SCR_1$ is effectively reduced below the holding current by providing a biasing potential in series with the rectifier which is the sum of the forward voltage drops of the diodes $D_1$ through $D_N$. By selecting a sufficient number of diodes $D_1-D_N$, the biasing potential across the diodes and the forward voltage drop across the controlled rectifier $SCR_1$ exceeds the normal power supply 20 output voltage. Therefore, as the dropping transient voltage approaches a level equal to the sum of the forward voltage drops through the diodes $D_1-D_N$ and the controlled rectifier $SCR_1$, the current through the diodes and rectifier decreases until it reaches the holding current level for the rectifier. The controlled rectifier $SCR_1$ then commutates and returns to its nonconducting state.

Preferably, the sum of the forward voltage drops across the diodes $D_1-D_N$ and controlled rectifier $SCR_1$, or the clamping voltage, is selected to be slightly above the normal output voltage of the power supply 20. This is to insure that the output voltage of the power supply 20 will always drop sufficiently below the clamping voltage to enable the controlled rectifier $SCR_1$ to commutate.

Figure 3:
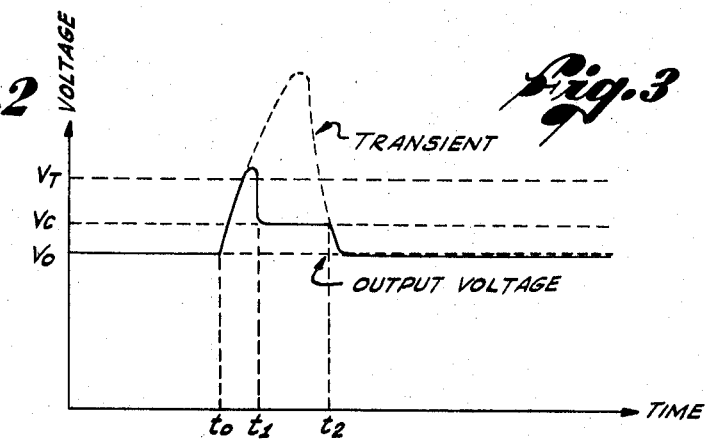
FIG. 3 is a graphical representation of the output voltage of the power supply during a voltage transient.

The operation of the circuit 26 for the transient protection device 24 of the present invention is graphically illustrated in FIG. 3 which shows the output voltage from the power supply 20 as a function of time. The normal output voltage $V_o$ is relatively constant except for the superimposed transient shown by the dotted line curve. The threshold voltage level $V_T$ is shown with a dotted reference line above the output voltage $V_o$ level, and the clamping voltage level $V_c$, also shown with a dotted reference line, is between the threshold voltage level $V_T$ and the output voltage level $V_o$.

The output voltage $V_o$ is shown relatively constant until time $t_o$ when a transient voltage is assumed to be superimposed on the output voltage $V_o$. The output voltage rises rather steeply in accordance with the transient voltage until the threshold voltage $V_T$ is reached. At that time, the silicon controlled rectifier $SCR_1$ is triggered. The output voltage $V_o$ is shown as rising slightly above the threshold voltage $V_T$ level due to the fact that a short time is required to turn on the controlled rectifier $SCR_1$. When the controlled rectifier $SCR_1$ is on, however, the output voltage $V_o$ is quickly brought to the clamping voltage level $V_c$, at approximately time $t_1$.

The output voltage $V_o$ then remains substantially at the clamping voltage $V_c$ throughout the greater part of the remainder of the transient. When the transient voltage drops to the clamping voltage level $V_c$ at a time $t_2$, the current through diodes $D_1-D_N$ and controlled rectifier $SCR_1$ is reduced below the holding current for the rectifier, and the rectifier returns to its nonconducting state. The output voltage $V_o$ then continues to drop to the normal operating level.

It should be noted that the time scales of FIG. 3 have been substantially exaggerated for purposes of illustration, while the voltage scales have been substantially compressed. Thus, the entire sequence of operation of the transient protection device 24 may normally be completed within a few milliseconds.

It will be appreciated that the particular voltage values for the threshold voltage $V_T$, clamping voltage $V_c$ and output voltage $V_o$ for the circuit 26 are determined by the characteristics of the particular components in the circuit. In turn, these voltage values will be selected according to the individual characteristics of the power supply 20 and the protected electrical circuit 22. Furthermore, the currents which the diodes $D_1-D_N$ and silicon controlled rectifier $SCR_1$ must be able to handle, will be in part determined by the output voltage $V_o$ of the power supply and its internal resistance.

The transient protection device 24 of the present invention may be supplied as individual units with preset output voltage $V_o$, clamping voltage $V_c$ and threshold voltage $V_T$ levels and with a particular current handling capability. Thus, for particular power supplies 20 and protected electrical circuits 22, the required transient protection device 24 may be individually selected and merely connected across the output terminals of the power supply 20.

Where the transient protection device 24 is adapted for use with a power supply 20 having a normal output voltage $V_o$ of 24 volts DC and a threshold voltage $V_T$ of 28 volts with a clamping voltage $V_c$ of approximately 27 volts is desired, typical component values in the circuit 26 of FIG. 2 would be as follows:

$SCR_1$ Type C106 (General Electric Co.)
Diodes $D_1$—$D_N$ Type IN4001 (Motorola) (quantity required is approximately 30 diodes with a forward voltage drop between 0.9 and 1.0 volts each.)
$ZNR_1$ Type IN750A (Motorola)
$R_1$ (selected by testing for particular threshold voltage required, typical values would range between 40 and 400 ohms.
$R_2$ 1 Kilohm The resulting circuit is rated at 1 ampere continuous current and 10 amperes on peak surge currents. It will be appreciated that the component values given may be modified considerably to meet particular conditions.

While the circuit 26 has been described as serving as a transient suppressor for a power supply 20, it will be appreciated that the transient protection device 24 of the present invention may be utilized with any generalized voltage source connected to the protected electrical circuit 22. Thus, the transient protection may be used on signal input lines or the like if the component values of the circuit 26 are properly chosen.

Figure 4:
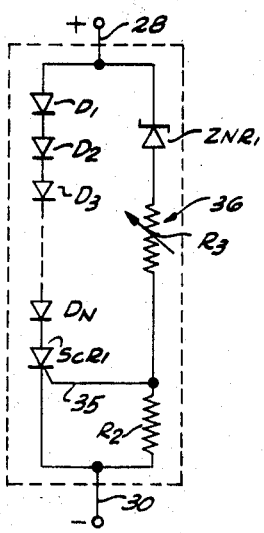
FIG. 4 is an electrical schematic diagram of a first variation of the device of FIG. 2 providing for varying the transient threshold triggering voltage level.

To provide for some versatility in selecting the threshold voltage $V_T$, the circuit 36 illustrated in FIG. 4 may be employed. In the circuit 36 of FIG. 4 the fixed resistor $R_1$ of FIG. 2 is replaced with a variable resistor $R_3$. In all other respects, the circuit 36 of FIG. 4 is identical to the circuit 26 of FIG. 2.

Since the threshold voltage $V_T$ is determined by the breakdown voltage of Zener diode $ZNR_1$ and the resistance values of the series resistors $R_2$ and $R_3$, as discussed above, the threshold voltage may be varied by varying the resistance of resistor $R_3$. Resistor $R_3$ may be chosen to provide a resistance range similar to the range of resistance values selected for resistor $R_1$, discussed above. Thus, for the illustration circuit, resistor $R_3$ may typically be a 500 ohm potentiometer.

Figure 5:
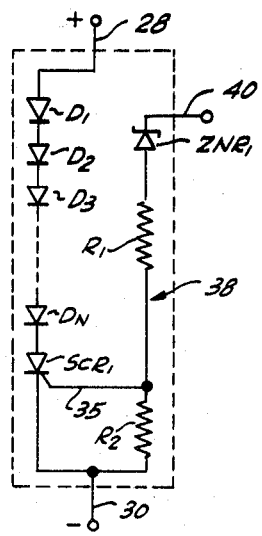
FIG. 5 is an electrical schematic diagram of a second variation of the device of FIG. 2 to provide for remote sensing of voltage transients.

It has been found that for certain applications it is desirable to connect the diodes $D_1$—$D_N$ and the controlled rectifier $SCR_1$ directly across the power supply, but to sense the voltage transient at some remote location, such as the output from a voltage regulator. For these applications, a circuit 38 as shown in FIG. 5 may be used. The operation and component values are the same as the basic circuit 26 of FIG. 2, but the controlled rectifier $SCR_1$ will not be triggered unless the voltage appearing between a remote sense terminal 40 and the negative terminal 30 of the circuit 38 reaches the threshold voltage level $V_T$.

While the turn-on time of a silicon controlled rectifier, such as the rectifier $SCR_1$, is ordinarily short, the turn-on times of diodes $D_1$—$D_N$ may, in some cases, be considerably longer. For very fast rise-time transients, in the neighborhood of 1,000 volts/second, the silicon controlled rectifier $SCR_1$ may begin to turn on, but the transient protection effect of the circuit 26 of FIG. 2 would not become operative until the diodes $D_1$—$D_N$ also turn on. Therefore, for fast rise time transients, the transient voltage may rise to a level much higher than the threshold voltage level $V_T$ before the diodes $D_1$—$D_N$ are also turned on. Since this would defeat the purpose of the transient protection device 24, in applications where fast time transients are present, the circuit 42 of FIG. 6 may be used.

In the circuit 42 a capacitor $C_1$ is connected across diodes $D_1$—$D_N$. When a fast rise time transient appears between the positive and negative terminals 28, 30 and the controlled rectifier $SCR_1$ turns on, the capacitor $C_1$ appears as essentially a short circuit between the positive terminal 28 and the anode of the controlled rectifier. Thus, the output voltage $V_0$, and the transient, may be substantially instantaneously shorted through the controlled rectifier $SCR_1$ until diodes $D_1$—$D_N$ turn on.

The addition of the capacitor $C_1$ also provides for enhanced commutation of the silicon controlled rectifier $SCR_1$. It will be appreciated that, when the transient voltage decreases to the clamping voltage $V_c$, the diodes $D_1$—$D_N$ and the silicon controlled rectifier $SCR_1$ begin to turn off. Without the capacitor $C_1$, the voltage across the diodes $D_1$—$D_N$ would quickly drop to substantially zero. However, since the diodes $D_1$—$D_N$ are turning off, the capacitor $C_1$ has no discharge path and the voltage remaining across the capacitor effectively back biases the silicon controlled rectifier $SCR_1$ during the turn off time, resulting in enhanced commutation.

Figure 6:
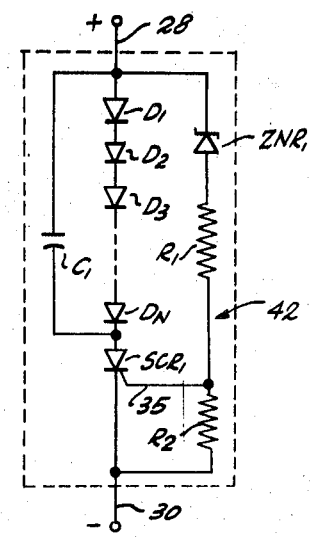
FIG. 6 is an electrical schematic diagram of a third variation of the device of FIG. 2 to enhance the turn on and commutation characteristics of the device for certain applications.

Supplementing the illustrative circuit values described above in connection with the circuits 26 and 36, capacitor $C_1$ in the circuit 42 of FIG. 6, may typically have a value of 50 microforads with a 50 volt rating.

For applications involving relatively high power supply 20 output voltages $V_o$, the physical size of the capacitor $C_1$ needed to handle the substantially instantaneous short circuit may be too large and expensive. For such applications, it has been found advantageous to employ another circuit 44 shown in FIG. 7. In the circuit 44, a capacitor $C_2$ is connected between the cathode of diode $D_N$ and some intermediate junction between the diodes $D_1$—$D_N$. The voltage-divider action of series diodes $D_1$—$D_N$ results in a lower voltage being applied across the capacitor $C_2$ so that its required voltage and current ratings may be lowered as well as its physical size. It will be appreciated that the circuit 44 is not as effective in compensating for a fast rise-time transient, but it is useful for less critical applications where physical size is important.

Figure 7:
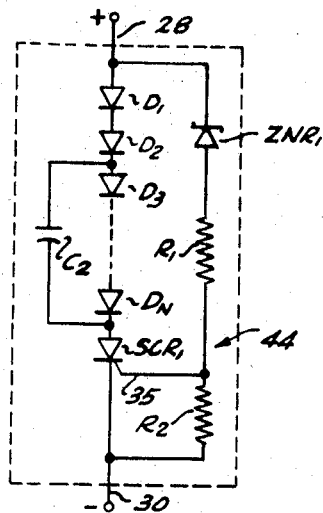
FIG. 7 is an electrical schematic diagram of a fourth variation of the device shown in FIG. 2 for use with relatively high output voltages.

It should be noted that, for both of the circuits 42 and 44 shown in FIGS. 6 and 7, respectively, when capacitors $C_1$ or $C_2$ discharge to a voltage level substantially equal to the sum of the forward voltage drops of the particular diodes across which the capacitor is connected, the capacitor is then blocked against further discharge. While in many applications the residual voltage is of no consequence, for some critical applications, it is highly desirable that the voltage across the capacitor $C_1$ or $C_2$ be reduced to zero after the transient protection device 24 completes its cycle of operation. To this end, a circuit 46, shown in FIG. 8, may be utilized.

Figure 8:
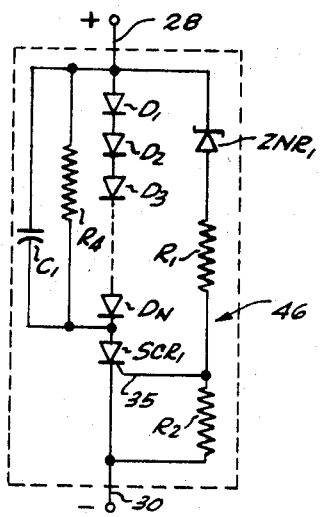
FIG. 8 is an electrical schematic diagram of a fifth variation of the device of FIG. 2 also for enhancing the commutation characteristics of the device for certain applications.

The circuit 46 of FIG. 8 includes a bleed resistor $R_4$ across the capacitor $C_1$ (or $C_2$ where the configuration of FIG. 7 is to be modified). Capacitor $C_1$, therefore, has an additional discharge path through resistor $R_4$ so that the voltage across capacitor $C_1$ can be substantially discharged to zero after the transient has ceased. A typical value for the bleed resistor $R_4$ in the illustrative circuit described above would be approximately 500 kilohms.

A known phenomenon of silicon controlled rectifier action is that the rectifier will turn on when the rate of voltage change across the anode to cathode junction exceeds a certain value. Under such conditions, the silicon controlled rectifier will turn on in the absence of a triggering voltage and despite the fact that the maximum voltage applied across the anode to cathode junction is less than the peak voltage rating of the rectifier.

Figure 9:
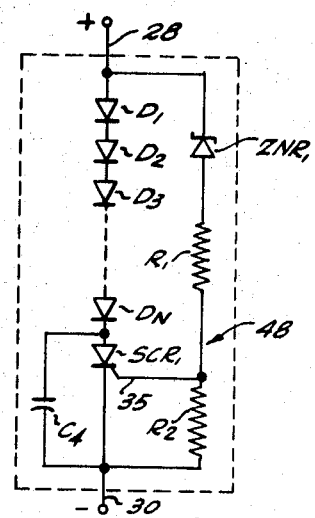
FIG. 9 is an electrical schematic diagram of a sixth variation of the device shown in FIG. 2 to stabilize and improve the voltage rate of change characteristics of the circuit for short rise time transients.

For ordinary operations, this phenomenon may be ignored because the usual transients encountered do not approach the rate of voltage rise required to turn on the silicon controlled rectifier. However, in some applications the rate of voltage rise of the transients encountered may exceed the rated value of the silicon controlled rectifier $SCR_1$ used in the basic circuit 26 shown in FIG. 2. When such transients are encountered, the silicon controlled rectifier $SCR_1$ could turn on even though the transient on the output voltage $V_o$ of the power supply 20 does not reach the threshold voltage $V_T$ ordinarily required to trigger the rectifier.

Where such spontaneous triggering of the silicon controlled rectifier $SCR_1$ is undesirable, a circuit 48, shown in FIG. 9, may be employed to prevent the rectifier from being triggered by such transients.

The circuit 48 of FIG. 9 includes a capacitor $C_4$ connected from the anode to the cathode of the silicon controlled rectifier $SCR_1$. Capacitor $C_4$ prevents the voltage across the anode to cathode junction of the controlled rectifier $SCR_1$ from changing rapidly enough to turn on the rectifier. A typical value for the capacitor $C_4$ for the illustrative circuit described above would be about 0.1 microfarads with a 50 volt rating. The capacitor $C_4$ should also preferably be designed for operation at high frequencies.

Figure 10:
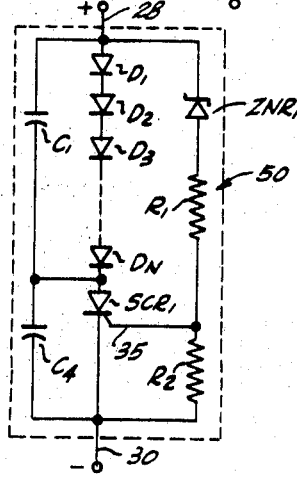
FIG. 10 is an electrical schematic diagram of a seventh variation of the device shown in FIG. 2 incorporating features of both the devices shown in FIGS. 6 and 9.

When the basic circuit 26 shown in FIG. 2 is to be utilized with the power supply 20 and protected electrical circuit 22 in which the transients appearing on the output voltage $V_0$ tend to have a rather fast rise-time, it may be desirable to utilize still another circuit 50 shown in FIG. 10. The circuit 50 in FIG. 10 includes the capacitor $C_1$ connected across the diodes $D_1 - D_N$, as in the circuit 42 of FIG. 6, to decrease the turn on time of the silicon controlled rectifier $SCR_1$, together with the capacitor $C_4$ as in the circuit 48 of FIG. 9, connected across the anode to cathode junction of the rectifier to prevent the rectifier from being triggered by very fast rise-time transients which do not rise above the threshold voltage level $V_T$.

It will be appreciated that while a number of variations have been described and illustrated in connection with the basic transient protection circuit 26 shown in FIG. 2 any of the variations may be concurrently employed depending on the particular transient characteristics of the power supply 20 and the protected electrical circuit 22 with which the transient protection device 24 is used.

Figure 11:
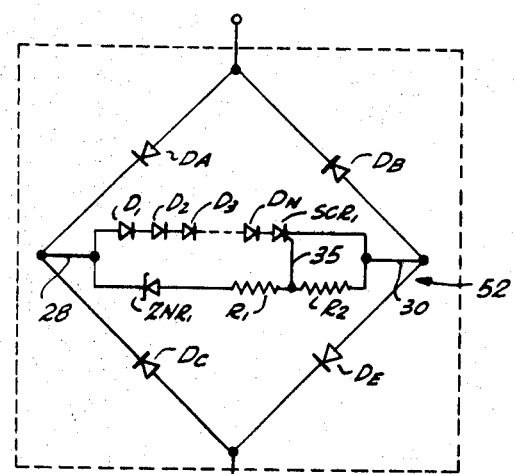
FIG. 11 is an electrical schematic diagram of a transient protection device constructed according to the present invention with auxiliary circuitry suitable for utilization of the circuit with alternating power supply voltages.

The transient protection device 24 of the present invention may also be utilized with alternating voltages by connecting the basic circuit 26 shown in FIG. 2 in a full-wave diode bridge circuit 52, as shown in FIG. 11. The operation of the basic circuit 26 is as described above in connection with FIG. 2, but the circuit 52 is operative on either half-cycle of the alternating voltage.

For the illustrative circuit of FIG. 11, the component values of the basic circuit 26 remain the same and diodes $D_A$ through $D_B$ of the full-wave bridge circuit 52 would typically be Type IN4001 diodes manufactured by Motorola.

Figure 12:
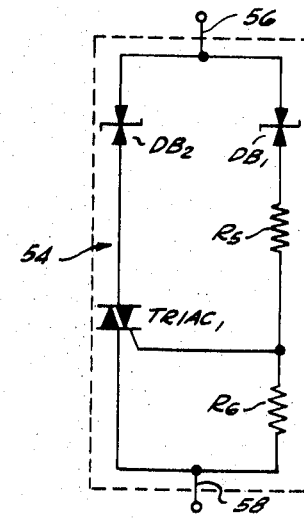
FIG. 12 is an electrical schematic diagram of still another device, in accordance with the present invention, suitable for transient protection in alternating current systems.

An alternate circuit 54 for a transient protection device 24 for use with alternating voltage power supplies 20 as shown in FIG. 12. The circuit 54 incorporates bidirectional semiconductor devices which are analogous to the silicon controlled rectifier and Zener diode used in the direct current circuits shown in FIGS. 2, and 4 through 10. A bidirectional triode thyristor $TRIAC_1$ is substituted for silicon controlled rectifier $SCR_1$ of the basic circuit 26 shown in FIG. 2 and a bidirectional breakdown diode $DB_1$ is substituted for the Zener diode $ZNR_1$ of the basic circuit. The diode $DB_1$ is in a series circuit with resistors $R_5$ and $R_6$ to supply the triggering signal to the gate electrode of the bidirectional triode thyristor $TRIAC_1$. A second bidirectional breakdown diode $DB_2$, or a string of such bidirectional diodes, replaces the series diodes $D_1 - D_N$ of the basic circuit 26.

The operation of the alternate circuit 54 of FIG. 12 is similar to the operation of the basic circuit 26 of FIG. 2, but the voltage across the terminals 56, 58 of the circuit may be of either polarity.

While particular embodiments of a transient protection device 24 of the present invention have been illustrated and described, it should be understood that various additional modifications may be made without departing from the spirit and scope of the invention.

I claim:

1. A device for use in protecting electrical circuitry against voltage transients, said device comprising:

means for clamping the voltage across two terminals to a characteristic voltage when energized, including a reverse biased triode thyristor, said thyristor including a gate electrode, and semiconductor device means for providing a biasing electrical potential connected in series with said thyristor when said thyristor is in a conducting state; and an energizing circuit having a predetermined voltage threshold of conduction, said energizing circuit being connected to said gate electrode.

2. A device as defined in claim 1, wherein said means for providing a biasing electrical potential includes one or more diodes connected in series to define a diode string.

3. A device as defined in claim 2, wherein said energizing circuit is a series circuit including a resistance and a normally nonconductive element.

4. A device for protecting electrical circuitry against voltage transients, said device comprising:

means for clamping the voltage across two terminals to a characteristic voltage when energized, including a silicon controlled rectifier having anode, cathode and gate electrodes, and a plurality of diodes connected in series with the anode to cathode junction of said controlled rectifier; and a series circuit including a resistance and a unidirectional breakdown diode, said series circuit being connected to said gate electrode of said controlled rectifier.

5. A device as defined in claim 4, wherein:

said series circuit has a predetermined threshold voltage of conduction, said silicon controlled rectifier being triggered when said series circuit conducts; and the sum of the values of the forward voltage drops across said plurality of diodes and said silicon controlled rectifier is substantially equal to or below said threshold voltage.

6. A device as defined in claim 4, wherein said resistance is selectively variable.

7. A device for protecting electrical circuitry from voltage transients, said device comprising:

means for clamping the voltage across two terminals to a characteristic voltage when energized, including a plurality of diodes and a silicon controlled rectifier connected in series, said silicon controlled rectifier having a gate electrode; and a series circuit including a Zener diode and a resistance, said series circuit being connected to said gate electrode, said series circuit being further connected to a remote transient sense terminal.

8. A device as defined in claim 4, and further including capacitive enhancement means for aiding in turning on said silicon controlled rectifier.

9. A device as defined in claim 8, wherein said enhancement means includes a capacitor connected across said plurality of diodes.

10. A device as defined in claim 8, wherein said enhancement means includes a capacitor connected in parallel with at least one of said plurality of diodes.

11. A device as defined in claim 8, wherein said enhancement means includes a capacitor and a parallel resistor connected in parallel with at least one of said plurality of diodes.

12. A device as defined in claim 4 and further including stabilizing means for stabilizing the short rise-time transient response of said silicon controlled rectifier.

13. A device as defined in claim 12, wherein said stabilizing means includes a capacitor connected across the anode to cathode junction of said silicon controlled rectifier.

14. A device as defined in claim 4, and further including:

a first capacitor connected in parallel across said plurality of diodes; and a second capacitor connected across the anode to cathode junction of said silicon controlled rectifier.

15. A device as defined in claim 4 and further including:

a first capacitor connected in parallel with at least one of said plurality of diodes; and a second capacitor connected across the anode to cathode junction of said silicon controlled rectifier.

16. A device for protecting electrical circuitry from voltage transients, said device comprising:
- at least one bidirectional breakdown diode connected in series with a bidirectional triode thyristor, said thyristor having a gate electrode; and
- a series circuit including a resistance and a bidirectional breakdown diode, said series circuit being connected to said gate electrode.

17. A device for protecting electrical circuitry from voltage transients, said device comprising:
- a full-wave rectifying bridge;
- a plurality of diodes and a silicon controlled rectifier connected in series across the output terminals of said full-wave bridge, the sum of the forward voltage drops across said diodes and said silicon controlled rectifier being a predetermined clamp voltage level, said silicon controlled rectifier having a gate electrode; and
- a series circuit including a Zener diode and a resistance connected to said gate electrode with said Zener diode being back biased and the threshold voltage at which said Zener diode conducts to trigger said silicon controlled rectifier into conduction being substantially equal to or above said clamp voltage.